United States Patent [19]

Drury, Jr. et al.

[11] 3,951,892

[45] Apr. 20, 1976

[54] AQUEOUS PRINTING VEHICLE

[75] Inventors: Raymond L. Drury, Jr.; Charles S. Nevin, both of Decatur; James W. Hines, Maroa, all of Ill.

[73] Assignee: A. E. Staley Manufacturing Company, Decatur, Ill.

[22] Filed: Apr. 9, 1973

[21] Appl. No.: 349,351

[52] U.S. Cl. .......................... 260/23 EM; 106/29; 106/30; 260/235 T; 427/258; 427/288; 428/500; 428/511
[51] Int. Cl.² .......................................... C18L 93/00
[58] Field of Search ................... 260/23 EM, 235 T; 106/29, 30; 427/258, 288; 428/500, 511 F, 143 A, 161 F, 161 GA

[56] References Cited
UNITED STATES PATENTS

| | | | |
|---|---|---|---|
| 2,640,782 | 6/1953 | Bloch | 106/29 |
| 2,762,712 | 9/1956 | Bloch | 106/29 |
| 2,824,846 | 2/1958 | Salyer | 260/235 T |
| 2,926,151 | 2/1960 | Kingston | 260/235 T |
| 2,941,968 | 6/1960 | McKenna | 260/235 T |
| 3,030,321 | 4/1962 | Lombardi | 260/235 T |
| 3,660,329 | 5/1972 | Wysocki | 106/30 |

*Primary Examiner*—M. J. Welsh
*Assistant Examiner*—William E. Parker
*Attorney, Agent, or Firm*—M. Paul Hendrickson; Charles J. Meyerson

[57] ABSTRACT

The invention provides a high-solids, low-viscosity, aqueous vehicle particularly adapted for use in coating cellulosic substrates under ambient conditions. The vehicle comprises a water-soluble oil with minute styrene polymer particles uniformly dispersed therein. The water-soluble oil portion comprises the reaction product of a dibasic acid or dibasic anhydride and a drying oil which is neutralized with a nitrogen base. The aqueous vehicle is especially useful in high solids, ink formulations having a high pigment to binder ratio.

54 Claims, No Drawings

AQUEOUS PRINTING VEHICLE

BACKGROUND OF THE INVENTION

There is a need for low cost, aqueous type-vehicles which are suitable for use as continuous film forming printing inks. Organic solvent vehicles create health, safety, pollution and other hazards. These hazards would be circumvented with the advent of a commercially acceptable, aqueous vehicle. Heretofore, numerous aqueous vehicles have been proposed as an organic vehicle replacement. Unfortunately, the aqueous based vehicles fail to possess prerequisite properties which enable them to function as an acceptable, organic vehicle replacement.

Included among the adverse functional attributes of aqueous based printing vehicles are: poor gloss, inferior film hardness, inflexibility and brittleness, incompatibility with diverse ink formulation components, poor wet and dry scuff resistance, non-homogenity or inability to retain ink homogenity throughout the printing operation, unstable viscosity, poor pigment loading, crazing, false bodying, floating and flocculation problems, low pigment to binder ratios, compounding deficiencies, poor printability characteristics, (e.g., accumulation or buildup of ink deposits upon the printing member, undesirable reological characteristic, poor tack characteristics, inferior ink transfer from the printing member to substrate, inferior hue and hiding power, inferior color development), etc. Since ink formulations are dependent upon a composite of functional attributes, attempts to correct one or more of the aforementioned defects generally accentuates some other undesirable characteristics to an even greater degree. These factors have frustrated attempts in finding a commercially acceptable aqueous vehicle substitute.

OBJECTS OF THE INVENTION

It is an object of the present invention to provide a superior, aqueous, printing ink composition.

Another object of the invention is to provide a high total solids, aqueous, printing ink composition possessing a functional printing ink viscosity.

A further object of the invention is to provide a water-soluble, aqueous vehicle which exhibits exceptional functional attributes in printing ink formulations.

A still further object of the invention is to provide a method of printing cellulosic substrates with aqueous ink formulations at a high total solids level.

An additional object is to provide an aqueous based ink vehicle characterized as possessing improved compatibility with organic, inorganic coloring agents and ink additives, compounding characteristics, ease of application and printing characteristics.

Another object of the invention is to provide a superior base ink at a high pigmentation and containing a novel, water-soluble, aqueous vehicle.

A further object of this invention is to provide an improved aqueous vehicle useful as an overprint varnish.

DISCLOSURE OF THE INVENTION

This invention relates to water based ink formulations suitable for use in the printing of cellulosic substrates, an aqueous vehicle and a method for using the same. More particularly, the present invention relates to a dispersion comprised of polymerized styrene particles uniformly dispersed throughout a continuous aqueous external phase of a water-soluble, nitrogen base neutralized, dicarboxylated drying oil, the printing inks containing the dispersion and the method for printing cellulosic substrates therewith.

According to the present invention, there is provided a printing ink composition suitable for use under ambient printing conditions and containing, uniformly dispersed throughout the ink composition, a styrene polymer dispersion as a principle ink vehicle on a weight basis, said printing ink composition comprising an admixture of:

A. A styrene polymer dispersion comprising:
  a. a continuous, aqueous external phase consisting essentially of an adduct reaction product of at least one dicarboxylic acid selected from the group consisting of an alpha, beta-ethylenically unsaturated dicarboxylic acid and an alpha, beta-ethylenically unsaturated dicarboxylic acid anhydride and an unsaturated glyceride oil, said adduct reaction product being neutralized with an aqueous solution of a tertiary amine in an amount sufficient to provide a water-soluble, tertiary amine salt reaction product having a pH within the range of 7.0 to 10.0,
  b. a non-continuous, internal phase of minute styrene polymer particles having an average particle size of less than 0.4 micron uniformly dispersed within said external phase, said styrene polymer dispersion being further characterized as containing (on total dry weight basis) at least 40% by weight of said external phase and said internal phase, less than 0.5% by weight monomeric styrene, and at least one part to less than two parts external phase dry solids for each three parts by weight of dry internal phase solids, and B. a color imparting agent of at least one member selected from the group consisting of an organic color agent and an inorganic coloring agent with the proviso that when the major coloring agent (on a total dry solid coloring agent weight basis) is an organic coloring agent, the ink composition contains from at least one part by weight to less than two parts by weight organic coloring agent for each two parts by weight styrene polymer dispersion dry solids, and that when the major coloring agent (total dry solids coloring agent weight basis) is an inorganic coloring agent, the ink composition contains from about 3 to 8 parts by weight inorganic coloring agent for each two parts by weight of dry styrene polymer dispersion solids, said ink composition being further characterized as containing at least 40% by weight dry solids and a sufficient amount of (A), (B), ink additives and water to provide a No. 2 Zahn cup reading of between 25–50 seconds, with the further proviso that when the ink composition contains organic coloring agents as a major coloring agent (on a weight basis), the total dry solids content of said printing ink composition ranges from about 40 to about 55% and when the inorganic coloring agents are a major coloring agent, the total dry solids content of said ink composition ranges from at least 55 to about 80% by weight.

The aqueous vehicle (i.e., the styrene polymer dispersion) can be conveniently prepared by (a) initially reacting a glyceride oil with the dicarobxylic acid, (b) neutralizing the resultant glyceride drying oil adduct with a tertiary amine to provide a water soluble reaction product and (c) polymerizing styrene in the presence of the water soluble reaction product under emulsion polymerization conditions to provide a styrene polymer dispersion containing the water-soluble, reaction product as a continuous external phase with an internal phase of minute, polymerized styrene polymer particles uniformly dispersed therein.

MALEATION STEP

The initial step of reacting glyceride oils with dicarboxyl acids to provide adducts thereof is well known to the art. For example, various adducts of long-chain ethylenically unsaturated fatty materials and alpha, beta-ethylenically unsaturated dicarboxy compounds (the alpha, beta-ethylenically unsaturated dicarboxy compounds are also referred to as "maleyl compounds") are disclosed in U.S. Pat. Nos. 2,033,131; 2,033,132 and 2,063,540 to Ellis; U.S. Pat. Nos. 2,188,882–90 and 2,285,646 to Clocker; 2,342,113 to Blair et al.; 2,423,230; 2,455,743 and 2,462,618 to Eilerman; 2,640,814 to Schmutzler; 2,678,934 to Grummit; 2,491,968 to McKenna; 2,967,837 to Greenfield; 3,015,566 to Becker et al.; 3,030,321 to Lombardi; etc. For the most part, these references have been directed principally to the so-called "maleated" or "maleinized" oils.

The maleating step is carried out by reacting the long-chain ethylenically unsaturated fatty compound and the alpha, beta-ethylenically unsaturated dicarboxy compound at a temperature of about 150°C. to 300°C. The long-chain fatty compound and the dicarboxy compound can be mixed together and heated to the desired reaction temperature. Alternatively, the dicarboxy compound can be added in increments to the long-chain fatty material while the latter is maintained at the desired reaction temperature. The continuous addition method is preferred because in commercial processes it can be controlled and reproduced, particularly when maleic anhydride is employed. When using maleic anhydride in a batch method, the exothermic temperature must be carefully controlled in order to prevent foaming and sublimation of the maleic anhydride. When the continuous addition method is used, the addition rate of maleic anhydride is controlled so that there is little or no refluxing.

This adduct reaction may be carried out at atmospheric pressure in an open vessel or under pressure in an autoclave. Maleic anhydride forms an adduct in almost quantitative yields in an open vessel and, accordingly, sealed reactors are not necessary. Other dicarboxy compounds, which are less efficient adduct formers, will give higher yields when a sealed system is employed.

The ratio of alpha, beta-ethylenically unsaturated dicarboxy compound to ethylenically unsaturated long-chain fatty compound in the reaction vessel can range from at least 2 moles to 4 or more of dicarboxy compound per equivalent of unsaturation in the unsaturated long-chain fatty compound. For example, the preferred naturally occurring glyceride oils, such as soybean oil or linseed oil, can be reacted with from at least 20 to 45% by weight of maleic anhydride to form adducts containing from about 2.0 to 4.5 moles of anhydride moieties per molecule of glyceride oil.

Ink formulations prepared from adducts which have been obtained by reacting less than 20% by weight maleic anhydride with a glyceride oil fail to possess sufficient wet rub resistance. Superior wet rub properties are imparted to ink formulation when more than about 25% by weight anhydride is reacted with the glyceride oil. Maleation of the glyceride oils with more than about 35% by weight maleic anhydride does not provide any significant improvements over those maleated at the 25–35% level. Maleated oils containing on an average of about 3 maleic anhydride moieties per molecule of glyceride oil are particularly well suited in the practicing of the present invention.

Exemplary long-chain ethylenically unsaturated compounds useful in preparing the maleated adducts herein are disclosed in U.S. Pat. No. 3,471,466. The polyunsaturated glyceride oils containing from 10–24 carbon atoms in the unsaturated chain such as those derived from animal and vegetable sources are particularly adapted to provide the maleated adducts herein. Illustrative unsaturated oils include soybean oil, corn oil, cottonseed oil, hempseed oil, tung oil, oiticica oil, safflower oil, peanut oil, linseed oil, tabocca seed oil, cod oil, herring (or menhaden) oil, dehydrated castor oil, etc. The glyceride oils and the esters of other unsaturated long-chain acids, such as the linoleic acid esters of trimethylol propane and tall oil fatty acid esters of pentaerythritol, are preferred since they contain a relatively large number of ethylenic double bonds available as sites for adduct formation. In general, those compounds having on an average at least two, and preferably three to nine, ethylenically unsaturated groups per molecule are preferred. Two conjugated ethylenic double bonds in a glyceride oil are equivalent to a single unconjugated ethylenic double bond because the two conjugated double bonds and the single unconjugated double bond each serve as a single site for adduct formation.

While a wide variety of alpha, beta-ethylenically unsaturated dicarboxy compounds, such as maleic acid, fumaric acid, dimethyl maleate, dibutyl maleate, monomethyl hydrogen maleate, mono-2-ethylhexyl hydrogen maleate, citraconic acid, citraconic anhydride, itaconic acid, itaconic anhydride, ethyl maleic acid, maleimide, maleamic acid, etc., can be used; maleic anhydride is the preferred dicarboxy compound because of (1) its low cost, (2) the ease with which it forms adducts in almost quantitative yields and (3) the high concentration of tertiary amine salt groups which result from the reaction of the anhydride adduct with a basic nitrogen compound. Fumaric acid requires more severe reaction conditions to form an adduct in lower yields. Citric acid and malic acid which form alpha, beta-ethylenically unsaturated dicarboxy compounds under the conditions of the maleation reaction can also be used in this invention. The break-free oils (e.g., alkali refined linseed and soybean oils) which are substantially free from natural antioxidants have been found particularly useful herein.

Upon completing the dicarboxylic acid-glyceride adduct reaction, the acidic moieties of the adduct are then neutralized with a tertiary amine to provide the water soluble, tertiary amine salt thereof. Suitable amines include those tertiary amines which are essentially free from amide forming reactive groups. Illustrative tertiary amines are characterized by the formula:

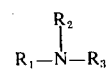

wherein $R_1$, $R_2$ and $R_3$ represent at least one member selected from the group consisting of alkyl, alkanols, alkylarylene, arylalkylene, polyalkyleneoxides (e.g., representing $+(CH_2)_n-O+_m$ groups wherein $n$ and $m$ are intergers), cyclic hydrocarbyl groups

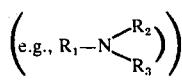

mixtures thereof and the like. As illustrated with maleic anhydride glyceride oil additives, the tertiary amine neutralization thereof proceeds as follows:

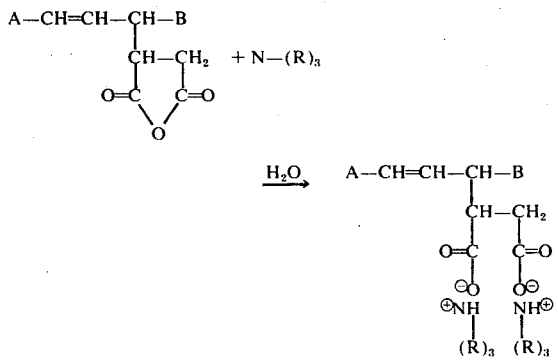

wherein A and B represent the remaining portion of the glyceride oil-maleic anhydride adduct and $(R)_3$ represents $R_1$, $R_2$ and $R_3$. The $R_1$, $R_2$ and $R_3$ groups may be substituted provided the substituents do not react with the dicarboxylic acid to form amides

As evident from the above equation, ammonium hydroxide and primary and secondary amines contain an active hydrogen group which will result in the formation of an amide group. Typical tertiary amines include triethylamine, trimethylamine, tripropylamine, diethylmethyl amine, trihexylamine, tributylamine, triethanolamine, tributanolamine, monoethanoldiethylamine, dimethyl ethanol amine, mixtures thereof and the like. Tertiary amines of lower alkyls (e.g., 1–3 carbon alkyl groups) are particularly useful.

The neutralization of the glyceride oil adduct proceeds rapidly when a stoichiometric amount or more of tertiary amine is admixed with the adduct. The pH of the neutralized adduct should be greater than 7.0 but less than 10.0. Many tertiary amines are readily volatized when admixed with glyceride oil adducts at elevated temperatures. Accordingly, upon completing the adduct reaction, it is desirable to cool before admixing the tertiary amines therewith. Performance of the final styrene dispersion is improved when the adduct is neutralized to a pH of greater than 7.5 to less than about 8.5 with particularly good results being achieved within the pH range of 7.6 to 8.2.

The oil adduct may be added to a mixture of water and tertiary amine. Alternatively, the water and/or amine may be mixed separately with the adduct. Because the styrene dispersions herein are extremely fluid at a dry solids content of less than 40% by weight, it is undesirable at this processing stage to add excessive water. In the polymerization process, from about 40 to about 60% by weight total dry solids (preferably about 50 to 60% are employed. With agitation, the neutralization can be effectuated under ambient conditions, however, neutralization temperatures of about 135°F. to about 170°F. are preferred. The neutralization occurs very quickly.

Upon tertiary amine neutralization, the water-soluble adduct is immediately polymerized in situ with styrene to provide an external aqueous, water-soluble phase of the neutralized adduct and an internal phase of minute styrene polymer particles uniformly dispersed therein.

The styrene polymer dispersion is prepared by polymerizing the styrene and other comonomers (if desired) in the presence of a catalyst and the water-soluble, glyceride adduct.

The major dispersing agent or emulsifier used in this invention is the water-soluble adduct. The water-soluble, glyceride adduct functions as a dispersing agent or emulsifier during the emulsion polymerization of the monomers. Accordingly, the emulsion polymerization can easily be conducted in the absence of other dispersing or emulsifying agents (i.e., substantially free from emulsifying agents other than the water-soluble adduct).

In order to achieve a styrene dispersion possessing suitable functional attributes in ink formulations, the weight ratio (dry solids basis) of water-soluble adduct to polymerizable monomeric constituents is necessarily maintained at between 1:3 to about 2:3. When an insufficient amount of adduct is utilized, excessive coagulum, excessive free monomers and inferior aqueous vehicle functionality result. Excessive adduct polymerization concentrations will adversely affect its performance in ink formulations. Unexpectedly superior results (e.g., ink performance, styrene particle size, exceptionally low free unpolymerized monomer content) are achieved when the aqueous vehicle contains a dry solids weight ratio of water-soluble adduct to styrene polymer within the range of about 3:7 to about 7:13.

Although not necessary, the so-called anionic and nonionic surface active agents may be also used. Suitable anionic surface active agents include alkali metal salts of alkyl aryl sulfonates, such as sodium dodecyl benzene sulfonate, sodium diamyl naphthalene sulfonate, disodium 4-dodecyloxydi-(benzene sulfonate) etc.; alkali metal salts of alkyl sulfates, such as sodium lauryl sulfate, sodium myristyl sulfate, etc. Suitable nonionic surface active agents include the alkylaryl polyoxyethylene glycols and alkylpolyoxyethylene glycols containing from 4 to 18 carbon atoms in the alkyl group and from about 2 to 120 oxyethylene units. The most advantageous concentration will depend, as in all emulsion polymerizations, in part on the emulsifier or emulsifiers used, the monomers to be polymerized, the initiator system, etc.

Conventional non-polymerizable anionic surface active agent can be used in a concentration up to about 0.6 part by weight per 100 parts by weight of the polymerizable monomers, but preferably in an amount of less than 0.1 part by weight of the polymerizable monomers. As the concentration of anionic emulsifier increases, adhesion and wet rub resistance decreases markedly. The nonionic and anionic emulsifiers will generally be less than about 3% of the total monomer weight. The best results are obtained when the total concentration of non-polymerizable anionic emulsifier and nonionic emulsifier is less than about 1.6% by weight of the total monomer concentration.

As polymerization catalysts, there may be used one or more of the free-radical catalysts. The catalyst can be soluble in aqueous solutions of the emulsifier or soluble only in the monomer phase, or both. Among the useful catalysts include the persulfates, inorganic peroxides, organic peroxides and hydroperoxides. Illustrative catalysts include hydrogen peroxide, benzoyl peroxide, tertiary butyl hydroperoxide, diisopropyl benzene hydroperoxide, cumene hydroperoxide, caproyl peroxide, methyl ethyl ketone peroxide, ammonium and potassium persulfate, mixtures thereof and the like. In part, the particular combination of monomers governs the selection of the catalysts since some monomers respond better to one variety than they do to another. The persulfates have been found to afford significantly better control over the styrene particle size and a significant reduction in coagulum. The peroxidic catalysts are particularly useful in polymerizing residual monomers which are present after substantial completion of the polymerization thereof with persulfates. Thus, after polymerizing substantially all the monomers, a minor amount of peroxide catalyst is conveniently added to the polymerization media to effectuate residual monomer polymerization.

The required amount of free radical catalysts is about proportional to the concentration of monomers used. The usual range is 0.01 to 3% by weight of the total monomer weight. The preferred range is about 0.10 to 1.0% while the range of 0.1–0.4% is usually best. The optimum amount of catalyst is determined in large part by the nature of the particular monomers selected, including impurities which accompany particular monomers. In general, it is preferred to use the lowest concentration of catalyst sufficient to give the desired rate of conversion, since higher catalyst concentrations tend to lower the polymer's molecular weight and results in poorer barrier properties.

Frequently, a promoter for the catalysts is used to hasten the reaction at a sufficiently low temperature to avoid coagulation. The promoter may be a reducing agent and the combination with the peroxidic catalyst is frequently referred to as a "redox system." Such systems are known. Exemplary promoters include erythorbic acid, ascorbic acid, soluble sulfites, hydrosulfites (e.g., sodium hydrosulfite), sulfoxalates (e.g., zinc or sodium formaldehyde sulfoxalate), thiosulfates, bisulfites (e.g., sodium metabisulfites) mixtures thereof and the like.

The amount of promoter required varies, as is known, with the free-radical initiator chosen and with the particular promoter. The emulsifying agent also affects somewhat the amount of catalyst used as does the particular monomers. At the outside, not more than 3 or less than 0.01% of promoter is used in these situations. The preferred range of erythorbic or ascorbic acid is at the low end of this range up to about 0.1% while sulfites are used preferably in an amount of 0.1 to 1%.

The emulsion polymerization is an exothermic reaction. Failure to appropriately control the reaction temperature during the polymerization can seriously and adversely affect the functional characteristics of the aqueous vehicle in ink formulations. Temperatures in excess of 200°F. tend to result in excessive large particles and excessive development of coagulum. Conversely, the lower temperatures (e.g., less than 45°F. or less) coupled with an insufficient polymerization time results in incomplete polymerization and the presence of excessive free monomers. Temperatures within the range of about 170°F. to less than about 190°F. are particularly useful in preparing the styrene polymer dispersions herein.

The polymerization process can be carried out batchwise or continuously. Due to the exothermic nature of the polymerization reaction, it is not pragmatic to work entirely batchwise by emulsifying the entire portion of monomers and proceeding with polymerization. The best mode of proceeding with the polymerization is to start with part of the monomers to be polymerized and add more monomer or monomers as polymerization proceeds. Gradual or incremental addition of monomer (either continuous or periodic) is advantageous in reaching a high solids content with optimum control of reaction conditions. Gradual or incremental addition of ethylenically unsaturated monomers, including the styrene, is particularly advantageous since this promotes the formation of additional micells facilitating the formation of a polydisperse emulsion polymer. Catalyst or components of the redox catalyst system may be added as the polymerization proceeds and these can be used to control the speed of reaction to avoid over-heating. In those cases where gradual or delayed addition of monomer is employed, it may be desirable to use part or all of the emulsifier (including the adduct) to emulsify the monomers prior to the addition to the polymerization zone.

The preferred method of preparing the styrene polymers of this invention comprises the steps of (1) initiating the polymerization of the monomers in the presence of the water-soluble, glyceride adduct and a catalyst system, (2) adding to the polymerization media additional monomer and additional catalyst at a predetermined rate and (3) terminating the polymerization at a predetermined solids content usually in the range of about 50 to 60% by weight total solids.

In preparing the styrene polymer dispersion or aqueous vehicle (frequently referred to in the art as a latex), the styrene monomer comprises (on a weight basis) at least a major portion of the monomer feed (i.e., styrene is at least the major polymer component). If desired, the styrene can be copolymerized with other monoethylenically unsaturated monomers in minor amounts.

Suitable other monoethylenically unsaturated comonomers include alkyl esters of alpha, beta-ethylenically unsaturated monocarboxylic acids containing from 1 to 18 carbon atoms in the alkyl group, such as methyl acrylate, ethyl acrylate, butyl acrylate, 2-ethyl hexyl acrylate, ethoxyethyl acrylate, methyl methacrylate, ethyl alpha-cyanoacrylate, etc.; alpha, beta-ethylenically unsaturated nitriles, such as acrylonitrile, methacrylonitrile, ethacrylonitrile, etc.; alpha, beta-ethylenically unsaturated amides, such as methacrylamide, acrylamide, etc.; (e.g., vinyl chloro benzene); vinyl halides, such as vinyl chloride, vinyl bromide, etc.; diesters of alpha, beta-ethylenically unsaturated dicarboxylic acids, such as dimethyl itaconate, diethyl fumarate, dimethyl maleate, etc.; alkyl vinyl ethers, such as methyl vinyl ether, ethyl vinyl ether, etc.; alkyl vinyl ketones, such as methyl vinyl ketone, terminal alpha-olefins (e.g., isobutylenes, butene-1, hexene-1), etc.

Although the water-soluble glyceride adducts impart excellent wetting characteristics, hydroxyalkyl esters of alpha, beta-ethylenically unsaturated acids may be copolymerized with the styrene to impart further internal polymeric wetting characteristics thereto (e.g., usually less than 10% by weight and preferably less than 5% of the total copolymerized monomer weight). Illustrative hydroxyalkyl esters of alpha, beta-ethylenically unsaturated carboxylic acids include hydroxyethyl acrylate, 2-hydroxypropyl acrylate, 4-hydroxybutyl-1-acrylate, hydroxyethyl methacrylate, 2,3-dihydroxypropyl methacrylate, di(hydroxyethyl) itaconate, ethyl hydroxyethyl maleate, di(2,3-dihydroxypropyl) fumarate, hydroxyethyl crotonate, hydroxyethoxyethyl methacrylate, etc. The above compounds are representative of hydroxyalkyl esters containing from 2 to 4 carbon atoms in the alkyl group.

Internal emulsifying characteristics may be imparted to the particles by copolymerizing the styrene with ethylenically unsaturated sulfur acids having a sulfur valence of six. Exemplary copolymerizable ethylenically unsaturated sulfur acids having sulfur in valence state 6 include any of the sulfoalkyl esters of alpha, beta-ethylenically unsaturated acids described in U.S. Pat. 3,147,301, 3,033,833, 2,914,499, 2,923,734 and 3,024,221, such as sulfoethyl acrylate, sodium sulfoethyl methacrylate, 3-sulfo-2-hydroxy-propylmethacrylate, di(sulfoethyl) itaconate, ethyl sulfoethyl maleate, di(sulfoethyl) fumarate, etc.; bisulfate esters of hydroxyalkyl esters of alpha, beta-ethylenically unsaturated acids, such as bisulfate ester of ethylene glycol monomethacrylate, bisulfate ester of triethylene glycol monoacrylate, etc. Generally, these ethylenically unsaturated sulfur acid internal emulsifiers will comprise less than 3% of the total copolymer weight (e.g., .3–3.0% and preferably less than 1.5% by weight).

Most suitably, the aforementioned comonomers will comprise less than 25% of the styrene total polymer weight with best results being achieved when these copolymerized monomers are less than 10% by weight (preferably less than 5% by weight of the total copolymerized monomers).

Styrene as the sole polymerized monomeric constituent of the polymer affords an excellent aqueous vehicle for the ink compositions. Substitution of the styrene with up to 50% by weight of a monovinyl aromatic (such as vinyl toluene) will not adversely affect the functional attributes of the aqueous vehicle. Styrene polymers comprised of styrene and vinyl toluene and substantially free from other copolymerized monomers may effectively be used in practicing the invention herein.

The particle size of the styrene polymer is a significant factor in obtaining a styrene polymer dispersion which can be effectively used in ink formulations. Polymer dispersion containing excessively large styrene particles (e.g., greater than 0.5 average micron size) do not possess the prerequisite and composite properties to function properly in ink formulations. Styrene polymer dispersions having an average particle size of less than 0.35 micron (e.g., 0.05–.35 micron), and preferably less than 0.25 micron are particularly functional in ink formulations. Exceptional results are achieved when the average particle size of the styrene polymer particles prepared herein is within the range of about 0.1 to less than 0.2 micron.

The printing ink characteristics and its printability will be adversely affected by excessive amounts of free monomeric styrene in the styrene polymer. For example, free styrene monomers in excess of 0.7% of the total styrene dispersion weight will result in incompatibility with the diverse ink ingredients, provide potentially available polymerizable styrene monomers (e.g., potential polymeric deposit development upon the printing members), and increase health and safety hazards, etc. Since most of the tertiary amines are readily volatized under conventional monomeric stripping techniques, the free styrene monomers cannot be effectively removed therefrom by stripping. This problem can be most suitably alleviated by conducting the polymerization under conditions wherein substantially all the available styrene monomers are converted to polymer (e.g., post addition of peroxide catalyst at the latter stages of the polymerization process to convert the residual monomer to polymer). Styrene polymer dispersion having less than 0.5% by weight free monomer on a dry dispersion solids basis (e.g., about 0.1 to about 0.4% by weight free styrene and preferably less than 0.30% by weight styrene) are most suitably adapted for use in the printing ink formulations.

On a total aqueous vehicle weight basis, the dry solids content should be at least 40% by weight (i.e., water-soluble adduct and styrene polymer total weight). At a lesser dry solids content, the viscosity characteristics of the aqueous vehicle are too low for satisfactory functionality in ink formulations. Particularly useful aqueous vehicle results are achieved when the total dry solids content of the external phase and internal phase ranges from at least 45 to about 75% by weight and preferably between at least 50 to less than 60% by weight.

Typically, these aqueous vehicles possess a relatively high viscosity at a dry solids level of about 55% by weight dry solids or more. At the higher aqueous vehicle dry solids levels (e.g., 55–60% level), the viscosity (pH 7.6–8.2, Brookfield at 20 rpm, No. 3 spindle and 77°F.) will normally range between at least 500 cps. up to 4,000 cps. or more. Upon dilution with water to lower the dry solids level (e.g., within the 45–55% range), the aqueous vehicles herein generally exhibit a precipitious viscosity decrease. Aqueous vehicles having a Brookfield viscosity ranging from about 1,000 cps. to less than 2,000 cps. and a total dry solids content of 55 ± 3% weight are particularly well suited in formulating inks. Typically at the 50% weight dry solids level, the viscosity will be less than about 300 cps. and about 75 cps. or less (usually less than 50 cps.) at the 45% by weight dry solids level. These viscosity characteristics are a particularly desirable functional attribute in ink compositions.

Illustrative viscosity characteristics of aqueous vehicles suitable for use in ink formulations are tabulated in the following table.

TABLE 1

| Low Viscosity Vehicle pH 7.9 | | Higher Viscosity Vehicle pH 8.3 | | High Viscosity Vehicle pH 7.95 | |
|---|---|---|---|---|---|
| % dry solids | Viscosity* (cps) | % solids | Viscosity* (cps) | % solids | Viscosity* (cps) |
| 54.8 | 350 | 53.1 | 1,075 | 56.7 | 2,845 |
| 52.5 | 145 | 52.5 | 438 | 55.0 | 1,060 |
| 50.0 | 70 | 50.0 | 168 | 52.5 | 460 |
| 47.5 | 40 | 47.5 | 85.5 | 50.0 | 175 |
| 45.0 | 35 | 45.0 | 48 | 47.5 | 85 |
| 40.0 | 10 | 40.0 | 23.5 | 45.0 | 45 |

TABLE 1-continued

| Low Viscosity Vehicle pH 7.9 | | Higher Viscosity Vehicle pH 8.3 | | High Viscosity Vehicle pH 7.95 | |
|---|---|---|---|---|---|
| % dry solids | Viscosity* (cps) | % solids | Viscosity* (cps) | % solids | Viscosity* (cps) |
| | | | | 40.0 | 10 |

*Brookfield, 77°F. at 20 rpm. with appropriate spindle

The aforementioned aqueous vehicles possess unexpectedly superior properties in ink base stocks and in press-ready ink preparations. Unlike the conventional aqueous ink vehicles, press-ready ink formulations containing the aqueous vehicles herein provide exceptional gloss, homogenity, resistance to phase separation, ease of compounding and printing, viscosity stability, wet and dry rub resistance, hue and hiding power, excellent machineability and ink transfer during the printing operation, tack, flowability, coverage characteristics, etc. Atypical of conventional aqueous vehicles, these aqueous vehicles provide a greater tolerance in both ink solids loading and water content. The low viscosity characteristics coupled with high solids loading capabilities of the aqueous vehicles enables the printer to provide printed articles of more intense coloring, sharper contrast and greater detail. At high solids levels, superior ink wetting and ink flow characteristics are achievable. Notwithstanding a high solids ink formula level, the aqueous vehicle enables the printer to obtain a significantly greater number of superior printed articles for a given ink quantity because the excellent hold-out of pigment and vehicle on the surface of paper or paperboard.

The color portion of color imparting compositions compatible with the aqueous vehicles of this invention include those coloring agents commonly used in the inks. Color imparting compositions employed with the aqueous vehicles herein include conventional dyes, toners and/or pigments as well as mixtures thereof. Typical pigments contemplated in the present ink compositions include colored as well as white pigments and mineral products conventionally used as printing ink fillers and printing ink extenders. Water insoluble, organic and inorganic printing ink pigments include titanium dioxide, zinc oxide, phthalocyanine blue and green, lead chromate, molybdate orange, zinc sulfide, calcium sulfate, barium sulfate (barytes), clay, mica, calcium carbonate (whiting), silica, benzylidene yellow, cadmium yellow, toluidine toners, sienna, amber, ultramarine blues, chromium oxides, carbon black, antimony oxide, magnesium silicate (talc), aluminum silicate, lead silicate, graphite, aluminum oxide, calcium silicate, diatamaceous silica, limonite, hematite, magnetite, siderite, selenium sulfides, calcined nickel titanate dioxide, molybdate oranges, chrome green, iron blues, benzidine yellows and oranges, iron salts of nitroso compounds, Hansa yellows, Di-nitraniline oranges, calcium lithol red, barium lithol red, permanent red 2B (watchung), red lake C, lithol rubine red, rhodamine red (process magenta), chrome yellows, victoria blue, methyl violet, and the like, as well as various combinations and preparations depending on the end use for which the ink is designed. Further illustrative dyes and pigments suitable for use as color imparting agents in aqueous formulations containing the polymers may be found in publications such as "Printing and Litho Inks," sixth and completely revised edition 1967 by Herbert Jay Wolfe, published by MacNair-Dorland Co., New York City, Chapters V–IX and in Chapter 2 of a book entitled "Industrial Printing Inks" by Louis M. Larsen 1962, Reinhold Publishing Company.

The aqueous vehicles are particularly adapted for use in compounding base stock ink formulations. These base stocks are normally combined with other base stock inks, and as required, other ink additives and letdown vehicles to provide a press-ready ink formulation. Because the divergent pigments used in the press-ready ink formulation usually possess inherently different grinding characteristics and optimum particle size for appropriate ink pigmentation, these base stocks conventionally necessitate different grinding techniques for their preparation. Thus, depending upon the particular type of pigment employed, it is conventional to grind the pigment and the aqueous vehicle together (e.g., in vertical and horizontal ball mills, sand mills, "Morehouse" mills, "Kady" mills and high speed dispersing mills). Unlike conventional aqueous vehicles which require a relatively low pigment loading and a low pigment to binder ratio, the aqueous vehicles herein afford a significant increase in base stock pigmentation as well as pigment to binder ratio. Grinding of the pigments to the appropriate size in the presence of the aqueous vehicle enhances the grinding rate and pigment uniformity. Base ink stocks using the aqueous vehicles herein which predominantly contain organic pigments are conviently prepared at about 20% to about 30% by weight pigment dry solids (based on the total base stock dry solids weight) and at a pigment to binder ratio of about 9:5 to about 1:1. Inorganic pigmented (on a predominate pigment weight basis) base stocks generally have (based on the total base stock dry solid weight) at least 50 to less than about 80% by weight inorganic pigment dry solids (preferably about 60 to about 70% by weight) and a pigment to binder ratio (dry solids basis) ranging from about 5:1 to 1:1 (preferably between about 4:1 to about 3:1). In these base ink stocks, the aqueous vehicle herein can be used as the sole vehicle. Other conventional ink binders may be used (if desired and compatible) in preparing these base stocks. However, the aqueous vehicle herein (on dry solids weight basis) will normally comprise the major ink binder. Significantly improved results are achieved when more than 75% by weight of the base stock binder (preferably more than 90%) is provided by the aqueous vehicle of the present invention.

Under the vigorous mixing conditions such as normally encountered in the preparation of base stocks, the aqueous vehicle has a tendency to foam. This problem can be effectively alleviated by adding a defoaming agent to the aqueous vehicle and pigment in an amount sufficient to inhibit foaming of the base stock. As recognized by the art, the required amount of defoaming agent will depend largely upon the efficacy of the defoaming agent and the degree of turbidity encountered. Incorporation of the defoamers into the base stock will also inhibit foam development in the press-ready ink.

Illustrative defoaming agents include alcohols, aliphatic acids and esters, fatty acid soaps, halogenated compounds, nitrogen containing compounds, phosphates, silicones, sulfides, sodium sulfonated oleic acid, sulfated tall oil fatty acid, high-molecular-weight fatty alcohols, oxyethylene polyoxypropylene propylene glycol, alkyl aryl ether alcohol, amine polyglycerol condensates, etc.

Due to its lipophilic and hydrophilic properties, the aqueous vehicles herein are compatible with a broad spectrum of cobinders such as those conventionally used in formulating ink and color imparting compositions. The auxiliary cobinders which may be used herein are characterized as either being soluble in the vehicle of this invention or can be uniformly dispersed therein under the basic conditions disclosed herein (e.g., latexes compatible with tertiary amines at the desired pH range herein). Accordingly, natural and synthetic resins may be formulated with the present aqueous vehicle. Natural resins such as fossil copal, copal, damar, shellac, rosin, mixtures thereof and the like may be employed. Similarly, chemical derivatives and synthetic resins such as rosin derivatives, cumarone resins and derivatives thereof, alkyd and polyester resins, certain cellulose derivatives, etc. may also be used as a cobinder.

Additional, auxiliary cobinders include the rosin esters which can be uniformly dispersed in the aqueous vehicle (e.g., rosin esters which are soluble or held in uniform dispersion or suspension by the aqueous vehicle). Illustrative rosin ester derivatives having relatively low softening points (e.g., usually less than 95°C.), frequently referred to as the soft rosins, include the methyl and hydrogenated methyl esters of rosin, ethylene and diethylene glycol esters of rosin, ethylene, triethylene, diethylene glycol hydrogenated esters of rosin, ethylene and diethylene glycol esters of polymerized rosin, glycol esters of rosin and glycerol esters of hydrogenated rosin. Illustrative hard rosin derivatives (e.g., exhibiting softening points above 95°C. and usually between 100°C.–185°C.) include glycerol esters of polymerized rosins, maleic-modified ester gums, pentaerythritol esters of rosin, modified pentaerythritol esters of rosin, etc. Comparatively, the soft rosin derivatives are generally more compatible with a broader spectrum of film formers than the hard rosin derivatives. The hard resin derivatives are generally incompatible with most film formers and possess inherent film brittleness. These adverse properties severely restrict their functionality as a film former. Since the aqueous vehicles herein are compatible with the hard rosin derivatives, the hard rosin derivatives can be used in conjunction with the present vehicle in coating and color imparting formulations. Dried films prepared from such coating and coloring imparting formulations exhibit significantly improved film hardness without being brittle.

The aqueous vehicles of the invention are generally compatible with water-miscible organic oxygenated solvents such as the alcohols (e.g., methyl alcohol, ethyl alcohol, isopropylalcohol, n-propyl alcohol, secondary butyl alcohol, n-butyl alcohol); the organo ester solvents such as methyl acetate, ethyl acetate, isopropyl acetate, n-propyl acetate, secondary butyl acetate, methyl ethyl ketone, methyl butyl ketone, dioxane mixtures thereof and the like. The glycol ethers such as methyl Cellosolve, butyl Cellosolve are not completely compatible with the aqueous vehicles of the present invention. When organic, water-miscible polar solvents are employed in preparing the coating and color imparting compositions, water is employed as the major vehicle solvent with the total amount of organic solvent being preferably less than about 10% by weight of the water.

If it is desired to improve upon certain film properties (e.g., solvent resistance, tensile strength, heat distortion, hardness, adhesion, etc.), crosslinking agents may be incorporated into the aqueous ink formulation. Thermoset crosslinking agents as well as those which are reactive under ambient conditions may be employed. Conventional crosslinking agents reactive with nitrogen group containing monomers such as acrylamide, methacrylamide, iminol methacrylate, etc. (e.g., those having amido and aziridinyl functional groups) are generally suitable for this purpose. Illustrative crosslinking agents include formaldehyde, hydroxyl urea-formaldehyde, mealmine-formaldehyde, epoxy carboxyl, anhydrides, mixtures thereof and the like.

In general, the incorporation of slip agents will improve upon the efficacy of the printing inks. Slip agents conventionally employed in the art to increase rub resistance, to decrease coefficient of friction and to a minor degree to contribute to the ink film hardness or toughness may be used for this purpose. Natural vegetable, petroleum and synthetic waxes are illustrative waxes conventionally employed as slip agents. The slip agents generally are utilized at a level of about 0.5% to about 3.5% of total weight of finished inks. Typical waxes (usually reduced to the appropriate particle size for ink formulations) include Carnauba wax, beeswax, paraffin waxes, microcrystalline waxes, Fischer-Tropsch waxes, polyethylene waxes, mixtures thereof and the like. As recognized by the art, the amount of slip agent required to impart the desired effect can vary considerably (e.g., type of printing, substrate, pigments, etc.). These waxes may be incorporated into the base stock or added to the final ink formulation.

If desired, other conventional ink additives such as non-offset agents, non-scum agents, anti-pinhole agents, tack reducing agents, driers, etc. may be also included. Greater latitude with regard to the divergent ink ingredients is achieved because of the aqueous vehicles broad spectrum of compatibility and unusual suspending properties.

The fountain inks (which is the ink preparation ultimately employed in printing and often referred to as press-ready ink) can vary considerably in solids and pigment content as well as its physical properties. Fountain inks containing organic coloring agents as the major colorant (on a weight basis) will generally have a total dry solids content between about 40 to about 55% by weight. The preferred range for the organic pigmented fountain inks is about 45 to about 50 weight percent. The pigment to binder weight ratio in these organic colorant based fountain inks will generally range between about 1:2 to about 1:1 and most preferably between about 3:5 to about 4:5.

When the major colorant (on a total dry solid coloring agent weight basis) is an inorganic color imparting agent (e.g., inorganic pigments), the fountain inks are formulated to a higher solids level. Illustrative fountain inks wherein the inorganic colorant is the major colorant ranges from at least about 55 to about 80% by weight total dry solids. Exceptional ink properties are obtained when the total dry solids content of the inorganic inks is within the range of about 65 to about 75% of the total dry solid weight. These inorganic pigmented fountain inks have been found to provide satisfactory printability when the pigment to binder weight ratio ranges from about 3:2 to about 5:2. Exceptional results are achieved when the pigment to binder ratio ranges between 9:5 to 2:1.

The fountain inks or press-ready inks herein are generally characterized as having a No. 2 Zahn cup reading within the range of at least 25 to about 50 seconds. Those inks formulated to a total dry solids content of about 40 to about 55% by weight will have a No. 2 Zahn cup reading generally between about 25 to about 40 and preferably between about 30 to about 35 seconds. At the high dry solids level (i.e., 55–80%), the No. 2 Zahn cup reading will normally be between about 25 to about 40 range while those at the 60 to 70% dry solids level are within the about 30 to about 35 seconds, No. 2 Zahn cup range. The aforementioned Zahn cup readings and ink characteristics can easily be achieved by diluting the base ink stocks and other required ink additives with the appropriate amount of water.

The fountain inks disclosed herein are particularly well adapted for the water-type retogravure and water-type flexographic printing process. Pervious, cellulosic substrates such as paper and paperboard stocks (e.g., the paperboard containers, towels, bags, corrugated boxes, lightweight folding cartons, stationery, labels, wallboard liners, trading stamps, gift wrap, etc.) provide particularly good printing substrates for these fountain inks. According to accepted printing practice, the fountain inks of the present invention may be applied to a suitable printing member, impregnated upon the cellulosic substrate and permitted to dry and thus provide a printed cellulosic substrate. The application of heat (e.g., heated rolls, air drying, microwave ovens, etc.) immediately after depositing of the ink upon the substrate has been found to further enhance the dry and wet rub resistance of the resultant printed article.

In another aspect of the invention, the aqueous vehicles may be utilized as an overprint varnish for printed cellulosic substrates such as paper and paperboard. As an overprint varnish, the cellulosic substrates may be previously printed with ink compositions containing the aqueous vehicles herein or alternatively be printed with printing inks which do not contain the aqueous vehicle of the present invention. When used as an overprint varnish, a cellulosic substrate is printed with any suitable printing ink with the aqueous vehicle herein being applied over the surface of the printed article as continuous film which upon drying will provide a cellulosic printed substrate having the aqueous vehicle as an overprint varnish.

Included among the advantages of the fountain inks herein are: minimum press ready time, fast image plate change, adaptability to high printing speeds, solid color coating, a faster drying ink, adaptability to both sheet and web feed stock, distinctive clear prints on both solids and screen work, excellent ink transfer and wet rub resistance, good printability on natural kraft and/or oyster clay coated and/or bleached liners, wide range of available color hues, efficient and easy ink handling, elimination of fumes, fire hazards and odors, excellent press stability, high vehicle solids at a low viscosity, improved gloss and high pigment loading.

The following examples are illustrative of the invention.

EXAMPLE 1

Preparation of the Aqueous Vehicle (A) Maleation

The below mentioned ingredients were utilized to prepare the aqueous vehicle.

| Ingredients | % by Weight |
|---|---|
| Maleic Anhydride Briquettes | 10.38 |
| Linseed Oil, Archer X Grade (ADM) (Stored in resin lined drums - 0.35 ppm max. iron content) | 24.24 |
| Balab 748 Defoamer (Witco Chemical) | 0.05 |
| Triethylamine (Tech. Grade) | 16.24 |
| Water | 49.09 |

Maleic anhydride is loaded into a feed vessel equipped with heating means. Residual air was removed from the feed vessel by vacuum. The maleic anhydride was heated to 140°–150°F. and pressurized to 30 psig with nitrogen. The reaction vessel was loaded with the linseed oil. Nascent air was removed from the reaction vessel by heating the linseed oil to 225°F., applying a vacuum of 25–28 inches mercury, pressurizing to zero psig with nitrogen and reapplying a vacuum to 25–28 inches mercury. With continual heating (to 410°F.) and mechanical agitation, the maleic anhydride was slowly metered into the reaction vessel. When the exothermic reaction had raised the temperature to 425°F., it was cooled sufficiently to maintain the reactants within the vessel at a temperature between 425°F.–445°F. During the reaction, the pressure was maintained at slightly less than 15 psig. If difficulty in maintaining the reactions within the 425°F.–445°F. range should occur, feeding of the maleic anhydride can be temporarily discontinued for a period of time sufficient to arrest the exothermic reaction. Upon completion of the maleic anhydride feeding, the reactants were then maintained at 425°F.–435°F. for an additional two hours at a pressure of 25–30 psig. The reaction product was tested for its anilic acid number[1] and found to be within the acceptable 149–166 range. The reaction product was cooled to 230°–240°F. and held under 15 psig nitrogen.

1 - A.O.C.S. method Tc 1a-64

B. Preparation of the water-soluble, tertiary amine-oil adduct

A uniform admixture of the water and defoamer was placed into a separate vessel. The triethylamine was then introduced. The reaction product of Example 1(A) [held above at 230°–240°F.] was added, and the mixture stirred for 30 minutes. The resultant aqueous solution of solubilized oil adduct should be at pH 8.5 ± 0.2. If below pH 8.3, it is adjusted to pH 8.5 with additional triethylamine. The resultant solubilized oil adduct was strained through a 150 micron nylon cloth and used in preparing the aqueous vehicle of 1(C) below. The dry solids content will normally be at approximately 50%, pH 8.3–8.7 and have a viscosity of 700–1,200 cps. (Brookfield at 77°F. and No. 3 spindle at 20 rpm.).

C. Aqueous Preparation

The following ingredients were utilized in preparing the aqueous vehicle:

| | Ingredients | % by Weight |
|---|---|---|
| (I) | Water | 11.50 |
| | Solubilized Linseed oil of 1(B) above | 43.32 |
| | Styrene | 34.11 |
| (II) | Ammonium Persulfate | 0.33 |
| | Water | 9.54 |
| (III) | Solubilized Linseed Oil | 0.26 |
| (IV) | Water | 0.07 |
| | t-Butyl Hydroperoxide-70 | 0.025 |
| (V) | Erythorbic Acid | 0.01 |
| | Water | 0.83 |

The polymerization reactor was charged with hot water (I), sealed, and depressurized to a vacuum of 27–28 inches. The ammonium persulfate and water of (II) above was placed in the catalyst feed tank. The solubilized linseed oil adduct was then introduced into the polymerization reactor while maintaining the reactor vessel contents at 170°F. Thereafter, 18% of the total styrene was introduced into the reactor maintained at 170°F. ± 2°F. Eighteen percent of the total aqueous ammonium persulfate solution (II) was charged to the polymerization reactor vessel whereupon the polymerization medium temperature increased to 180°–190°F. While maintaining the polymerization reactor temperature at 180°F. ± 2 (via cooling), the remaining portions of the styrene and ammonium persulfate were simultaneously and continuously admitted. The styrene and persulfate rates were regulated so as to maintain the polymerization reaction temperature at 180°F. ± 2°. After approximately two hours feed time, the styrene addition had been completed; within an additional 30 minutes the persulfate addition was completed. The reaction was then permitted to continue for an additional thirty minutes while maintaining the temperature at 180°F. ± 2. In order to complete the styrene polymerization, aqueous t-butyl hydroperoxide (i.e., (IV)) was admitted to the reactor. While still maintaining the reaction media at 180°F., aqueous erythorbic acid (i.e., (V) above) was admitted. Upon completion of the erythiobic acid feed, the polymerized product was maintained at 180°F. ± 2 for an additional hour. The resultant aqueous vehicle was then cooled and strained through an 80 mesh nylon screen.

A typical analyses of aqueous vehicle prepared in accordance with this Example 1 is:

| | |
|---|---|
| Residual styrene[2] monomer | 0.25% |
| Total dry solids[3] | 55% |
| pH | 7.9 |
| Brookfield Viscosity at 77°F. (20 rpm No. 3 Spindle) | 1,000 |
| Sediment (on U.S. No. 80) | None |
| Initial viscosity[4] of standard ink at 77°F., No. 2 Zahn cup | 17 seconds |
| Viscosity increase on aging[4] | 15% max. (Usually less than 5%) |
| Average styrene particle size[5] | 0.15 micron |

[2]Styrene is determined by extraction from the polymer dispersion with benzene, injection of the benzene extract into a gas chromatograph for separation of the styrene, and measurement by comparison against a standard containing a known amount of styrene.
[3]The dry solids are determined by drying a known weight of the aqueous vehicle in a forced draft oven at 100° ± 1°C. for exactly four hours and weighting the residue to ± 0.01 gram.
[4]A standard ink is prepared using a set amount of pigment and a set amount of aqueous vehicle solids. This mixture is ground to a zero reading on a fineness of grind gauge (Precision Gage & Tool Co., Dayton, Ohio) using 1/8" stainless steel shot in a Red Devil paint conditioner ink is measured to ± 0.1 second at 25°C. with a No. 2 Zahn cup (Sargent-Welch Scientific Co.). The ink is stored in a sealed container for 72 hours at 25°C. Settled pigment is resuspended by stirring with a spatula and the viscosity is rerun. This second measurement is the aged viscosity.
[5]The determination of the average particle size of synthetic latices by turbidity measurements, Arnold B. Loebel, Official Digest, February, 1959, pages 200–213.

EXAMPLE 2

Preparation of single pigmented base colors

In the preparation of single pigmented base colors, the use of the aqueous styrene polymer dispersion as the grinding and dispersing vehicle allows high pigment loading. Exemplary thereof is the following:

| Type of Pigment | (Range) % Pigmentation | (Range) P/B Ratio |
|---|---|---|
| Organic | 20–30 | 1.0–1.8 |
| Inorganic | 50–80 | 1.0–5.0 |
| Typical | % Pigmentation | P/B Ratio |
| Organic | 25 | 1.5 |
| Inorganic | 60 | 3.5 |

The above pigmentation and P/B ratio produces a flowable base ink which will not body-up or thicken on prolonged storage.

| A - Organic base color Parts by weight | Ingredients |
|---|---|
| 25 | 20-4200 barium lithol red (American Cyanamid) |
| 30 | Aqueous styrene polymer dispersion (55% solids) |
| 1 | Defoamer |
| 44 | Water P/B Ratio 1:5 Pigmentation % – 25% |
| 100.0 | |

Grind the above ingredients in a sand mill for 35 minutes. The resultant organic pigmented base color was characterized as having a fineness of grind value of less than 3.0 by N.P.I.R.I. Grindometer (Precision Gage & Tool Co., Dayton, Ohio). The base color pigments were uniformly dispersed throughout the aqueous styrene polymer dispersion. Aging of base color under ambient conditions did not appreciably alter its excellent flow characteristics.

| B - Organic base color | Ingredients |
|---|---|
| 30 | 20-4200 barium lithol red (American Cyanamid) |
| 36.5 | Aqueous styrene polymer dispersion (55%) |
| 1 | Defoamer |
| 32.5 | Water  % Pigmentation 50% |
| 100.0 | P/B Ratio 1.5 |

The aforementioned ingredients were ground for 40 minutes in a sand mill. The resultant organic base color possessed properties as in 2(A) above.

| C - Inorganic base color Parts by Weight | Ingredients |
|---|---|
| 60 | No. 2737 chrome yellow (Harshaw Chemical Co.) |

C - Inorganic base color

| Parts by Weight | Ingredients |
|---|---|
| 31 | Aqueous styrene polymer dispersion (55%) |
| 1 | Defoamer |
| 8 | Water     % pigmentation 60% |
| 100.0 | P/B Ratio 3.5 |

Grind for 30 minutes as in 2(A) above. Similar results as in 2(A) above were observed.

D - Inorganic base color

| Parts by Weight | Ingredients |
|---|---|
| 65.0 | Titanium dioxide RA-48 (E. I. duPont) |
| 32.6 | Aqueous styrene polymer dispersion (55%) |
| 1.0 | Defoamer |
| 1.4 | Water     % Pigmentation 65% |
| 100.0 | P/B Ratio 3.6 |

The aforementioned 2(D) ingredients were ground as in 2(B) above. The excellent base color results of 2(A) above were obtained.

E - Inorganic finished ink formulations

The following ingredients were blended together for three minutes.

| Parts by Weight | Ingredients |
|---|---|
| 23.5 | Aqueous styrene polymer dispersion (55%) |
| 8.5 | Water |
| 1.0 | Lecithin |
| 2.5 | DE 6 |
| 1.0 | Defoamer |
| 36.5 | |

The aforementioned blend was placed in a sand mill and ground for 30 minutes while slowly adding 45 parts by weight of No. 2737 chrome yellow (Harshaw Chemical Company). Upon completion of the grinding, an additional 18.5 parts by weight of the aqueous styrene polymer dispersion (55%) was added to grind and thoroughly blended together for an additional five minutes. The finished inorganic ink (press-ready) possessed the following characteristics.

Total solids - 70%
P/B ratio - 1.9
Pigmentation - 45%
Viscosity 30–35 sec.
(No. 2 Zahn cup)

F - Finished organic ink formulation

| Parts by Weight | Ingredients |
|---|---|
| 31.0 | Aqueous styrene polymer dispersion (55%) |
| 17.5 | Water |
| 1.0 | Lecithin |
| 2.7 | DE 6 |
| 4.2 | Ethanol |
| 1.0 | Defoamer |
| 57.4 | |

The aforementioned ingredients were thoroughly blended together by mixing for three minutes while slowly adding 18.1 parts by weight barium lithol red 20–4200 (American Cyanamid). The resultant blend was then ground for 30 minutes in a sand mill. Thereafter, 3.0 parts by weight water and 21.5 parts by weight of the aqueous styrene polymer dispersions (55%) was admixed therein by blending for an additional five minutes. The resultant inorganic finished ink possessed the following characteristics.

Total solids - 49%
P/B ratio - 0.62
Pigmentation - 18%
Viscosity - 30–35 sec.
(No. 2 Zahn cup)

G - Organic finished ink prepared from a single pigmented base color

| Parts by Weight | Ingredients |
|---|---|
| 68 | Example 2(A) above |
| 25 | Aqueous styrene polymer dispersion (55%) |
| 1 | Defoamer |
| 4 | Propylene glycol |
| 2 | Wax |
| 100 | |

Solids - 44%
P/B - 0.71
Pigmentation - 17%
Viscosity - 30–35 sec.
(No. 2 Zahn cup)

Mix ingredients together without grinding.

H - Organic finished ink using 2(B) base color

| Parts by Weight | Ingredients |
|---|---|
| 60 | Example 2(B) base color |
| 32.6 | Aqueous styrene polymer dispersion (55%) |
| 1.0 | Defoamer |
| 4.4 | Diethylene glycol |
| 2.0 | Wax |
| 100.0 | |

Blend together without grinding.
Properties
Solids - 50%
P/B - 0.6
Pigmentation - 18%
Viscosity - 30–35 sec.
(No. 2 Zahn cup)

I - Inorganic finished ink using color base 2(D)

Thoroughly mix ingredients together without grinding.

| Parts by Weight | Ingredients |
|---|---|
| 69 | Example 2(D) |
| 18.4 | Aqueous styrene polymer dispersion (55%) |
| 1.0 | Defoamer |
| 2.0 | Wax |
| 5.0 | Propylene glycol |
| 4.6 | Water |
| 100.0 | |

Properties
Solids - 69.5%
Pigmentation - 45.0%
P/B ratio - 2.0
Viscosity - 30–35 sec.
(No. 2 Zahn cup)

In preparing the base coloring agents and press-ready ink formulations, it has been observed that the aqueous styrene polymer dispersion imparts several distinct improvements over conventional water-type vehicles. The aqueous vehicles herein demonstrate good pigment wetting properties in the grinding of the organic and inorganic pigments. The inks exhibit low viscosity notwithstanding the high pigment loading. The addition of a small amount of ethanol (about 2–5% by weight) may be used to further aid in pigment wetting and to increase the press-ready viscosity. Stability of the ink under mechanical shear and ambient storage was excellent. The freeze/thaw stability was greater than five cycles.

The aforementioned final ink formulations or press-ready inks were utilized in the printing of paper and paperboards. Rotogravure and flexographic printing processes were employed to print the substrates. Comparative to other water-type ink formulations, the above press-ready inks exhibit a faster drying rate with superior solvent release characteristics. Excellent ink mileage was obtained. The wet-rub resistance was good. The dry printed articles possessed a high gloss, good organic solvent resistance and very good water resistance. The printed articles possessed intense coloring, sharper contrast and greater detail in comparison to the conventional aqueous vehicle press-ready inks. The stability against viscosity pH changes and ink component separation during the printing cycle was excellent. Transfer character of the inks from the printing member to substrate and wetting thereof was excellent. The dried printed articles had good film adhesion, toughness and strength.

Comparative to conventional water-type vehicles which contain bleeding dyes, the ready-print inks containing the aqueous vehicle have been found to exhibit significantly improved resistance towards water bleeding.

If a fast drying speed is desired, it is recommended water be used for press reduction. The drying rate may be retarded by incorporating into the press-ready ink glycols such as ethylene, propylene, hexylene and diethylene glycols and these glycols will further improve the ink transfer properties.

EXAMPLE 3

The aqueous styrene polymer dispersion prepared in accordance with Example 1 was employed as an overprint varnish. When used as an overprint varnish, the characteristics of the aqueous styrene polymer dispersion are substantially the same as those described above in respect to press-ready inks with the exception that the color imparting agents are excluded. Although not necessary, the styrene polymer dispersion can be formulated with the conventional press-ready ink additives which are utilized to enhance its film forming adherence to cellulosic substrates and printability characteristics. Depending upon the type of equipment utilized in applying the aqueous dispersions to a printed cellulosic substrate, the dispersion dry solid is adjusted to the appropriate level to permit the coating of the printed cellulosic substrates therewith. Aqueous styrene polymer dispersion adjusted to a 2 Zahn cup viscosity of about 20 seconds to about 50 seconds (preferably between about 25 seconds to about 35 seconds) are generally suitable for use as a press-ready overprint varnish. The press-ready, overprint varnish may be applied to the printed cellulosic substrates by conventional overprint varnish means such as rubber transfer roller application, rotogravure and glexographic presses, etc. Heat drying will improve upon the overprint varnish coating characteristics. Employing the aqueous styrene polymer, dispersion of Example 1 diluted with water to a No. 2 Zahn cup reading of 30 seconds, provided results similar to those obtained by the press-ready inks in Example 2.

Since many embodiments of this invention may be made and since many changes may be made in the embodiments described, the foregoing is to be interpreted as illustrative only and our invention is defined by the claims appended hereafter.

What is claimed is:

1. An aqueous polymer dispersion possessing film-forming characteristics under ambient drying conditions and adaptable for use as an aqueous printing vehicle, said polymer dispersion comprising:
   a. a continuous, aqueous external phase consisting essentially of an adduct reaction product of at least one dicarboxylic acid selected from the group consisting of an alpha, beta-ethylenically unsaturated dicarboxylic acid and an alpha, beta-ethylenically unsaturated dicarboxylic acid anhydride and an unsaturated glyceride oil, said adduct reaction product being neutralized with an aqueous solution of a tertiary amine in an amount sufficient to provide a watersoluble, tertiary amine salt reaction product having a pH within the range of 7.0 to 10.0, and
   b. a non-continuous, internal phase of minute polymer particles of a polymerized monovinyl aromatic monomer having an average particle size of less than 0.4 micron uniformly dispersed within said external phase, said polymer dispersion being characterized as containing at least one part to less than two parts external phase dry weight solids for each three parts by weight dry internal phase solids, the total dry solids weight of said external phase and said internal phase being at least 40% with the remaining nonsolids portion of said polymer dispersion consisting essentially of water, said polymer dispersion being further characterized as containing less than 0.5% by weight monovinyl aromatic monomer.

2. The aqueous polymer dispersion according to claim 1 wherein the adduct is neutralized with a tertiary amine to a pH between about 7.5 to about 8.5.

3. The polymer dispersion according to claim 1 wherein the unsaturated glyceride oil is characterized as having from at least 2 moles to about 4.5 moles adduct substituents per mole of glyceride oil.

4. The styrene polymer dispersion according to claim 1 wherein the average styrene particle size is within the range of 0.05 micron to less than 0.25 micron and the polymer particles consist essentially of from about 50 by weight to 100% polymerized styrene, about 0 to about 50% by weight polymerized vinyl toluene and 0 to 10% by weight of another polymerized monoethylenically unsaturated monomer other than styrene and vinyl toluene.

5. The aqueous polymer dispersion according to claim 2 wherein the glyceride oil consists essentially of a maleic anhydride oil adduct in a molar ratio of at least 2.5 moles to about 3.5 moles of maleic anhydride for each mole of glyceride oil.

6. The aqueous polymer dispersion according to claim 5 wherein the glyceride oil is at least one drying oil selected from the group consisting of linseed oil and soybean oil.

7. The aqueous polymer dispersion according to claim 6 wherein the polymer particles consist essentially of at least one polymerized monomer selected from the group consisting of styrene and vinyltoluene with styrene on a weight basis being the major polymerized monomer.

8. The aqueous polymer dispersion according to claim 6 wherein the adduct is neutralized with a trialkyamine to a pH of between 7.6 to 8.2, the total dry solids weight of said external phase solids and said internal phase solids is greater than about 50 by weight to about 60% by weight.

9. The aqueous polymer dispersion according to claim 8 wherein the polymer dispersion consists essentially of styrene homopolymer particles having an average particle size within the range of 0.1 micron to 0.2 micron and the free styrene monomer content is less than about 0.4% by weight of the total aqueous polymer dispersion weight.

10. The aqueous polymer dispersion according to claim 9 wherein the viscosity of the dispersion range from about 500 cps. to 3,000 cps. and the dispersion is further characterized as having a viscosity of less than 50 cps. when diluted with water to a total dry solids weight content of 40%.

11. A process for preparing an aqueous polymer dispersion having an aqueous external phase of a water-soluble, glyceride oil adduct and an internal phase of minute vinyl aromatic polymer particles uniformly dispersed therein, said process being conducted under conditions sufficient to provide a dry solids content of at least 45% by weight and a free monovinyl aromatic monomer content of less than 0.7% by weight of the total aqueous dispersion weight, said process comprising the steps of:

A. reacting at least one dicarboxylic acid selected from the group consisting of an alpha, beta-ethylenically unsaturated dicarboxylic acid and an alpha, beta-ethylenically unsaturated dicarboxylic acid anhydride with an unsaturated glyceride oil under adduct reaction conditions sufficient to provide an oil adduct containing at least 2 moles to about 4.5 moles of the dicarboxylic acid per equivalent of unsaturation in the unsaturated glyceride oil, B. neutralizing the oil adduct with an aqueous tertiary amine solution to a pH of greater than 7.0 but less than 10.0 and thereby providing a tertiary amine water-soluble salt of said oil adduct, C. initiating, in the presence of persulfate catalyst, the polymerization of the internal phase in a polymerization media comprised of at least a portion of the tertiary amine water-soluble oil adduct and a monovinyl aryl monomer, D. incrementally adding additional vinyl aryl monomer and additional persulfate catalyst at a predetermined rate to the polymerization media while maintaining the temperature of the reaction media at a temperature of less than 200°F., E. continuing the polymerization of monovinyl aryl monomer under conditions of (D) above for a period of time and under conditions sufficient to provide a weight ratio of water-soluble adduct to polymerizable monomer constituents of 1:3 to about 2:3, F. permitting substantially all of the monovinyl aryl monomers in the polymerization media to be polymerized via the persulfate catalyst, and G. polymerizing the residual monovinyl aryl monomers by adding a peroxide catalyst and a promoter to the polymerization media and permitting the polymerization to continue for a period of time and under conditions sufficient to reduce the total free monovinyl aryl monomers to a level of less than 0.7% by weight of the aqueous polymer dispersion weight.

12. The process according to claim 11 wherein the dicarboxylic acid consists essentially of maleic anhydride in an amount ranging from about 2.5 to about 4.0 moles per equivalent of unsaturated glyceride oil.

13. The process according to claim 12 wherein the glyceride oil is a drying oil having an average degree of ethylenically unsaturation ranging from about 3 to about 9 groups per molecule of glyceride oil.

14. The process according to claim 13 wherein the polymerization temperature is maintained between 170°F. to 190°F. and the monovinyl aryl monomers comprises at least 75% of the total polymerizable monomer weight and from 0 to 25% by weight of another monoethylenically unsaturated monomer.

15. The process according to claim 14 wherein the monovinyl aryl monomer is at least one member selected from the group consisting of styrene and vinyl toluene and styrene on a weight basis comprises at least a major portion of the monovinyl aryl monomer.

16. The process according to claim 15 wherein step (G) is conducted for a period of time sufficient to provide an aqueous polymer dispersion containing less than 0.5% by weight styrene monomer and the dry solids weight content of said aqueous dispersion is at least 50 to less than 60% by weight with the balance thereof consisting essentially of water.

17. The process according to claim 15 wherein the persulfate catalyst is at least one member selected from the group consisting of ammonium persulfate and sodium persulfate.

18. The process according to claim 17 wherein the polymerization of the residual monomer is conducted in the presence of an organic hydroperoxide and the promoter is at least one member selected from the group consisting of ascorbic acid and erythorbic acid.

19. The process according to claim 18 wherein polymerizable monomers admitted to the polymerization media is comprised of at least 90% by weight styrene and from 0–10% by weight of other monoethylenically unsaturated monomers.

20. The process according to claim 19 wherein polymerization temperature is maintained between about 175°F. to about 180°F. and the polymerization of residual monomers in the presence of the organic hydroperoxide catalyst and promoter is continued for a period of time sufficient to provide an aqueous dispersion containing less than about 0.35% by weight monomer styrene.

21. The process according to claim 20 wherein the polymerized monomer is styrene.

22. In a method for providing overprint varnish on a printed cellulosic article wherein a pervious, cellulosic substrate is printed with a printing ink to provide a printed article, an aqueous vehicle is applied as continuous film coating upon the surface of the printed article, and permitting the aqueous coating to dry and thereby provide printed article having the aqueous vehicle solids as a coating film thereon, the improvement which comprises the utilization of an aqueous polymer dispersion as the aqueous coating vehicle, said aqueous polymer dispersion consisting essentially of:
a. a continuous, aqueous external phase consisting essentially of an adduct reaction product of at least one dicarboxylic acid selected from the group consisting of an alpha, beta-ethylenically unsaturated dicarboxylic acid and an alpha, beta-ethylenically unsaturated dicarboxylic acid anhydride and an unsaturated glyceride oil, said adduct reaction product being neutralized with an aqueous solution of a tertiary amine in an amount sufficient to provide a water-soluble, tertiary amine salt reaction product having a pH within the range of 7.0 to 10.0,
b. a non-continuous, internal phase of minute, monovinyl aromatic polymer particles having an average particle size of less than 0.4 micron uniformly dispersed within said external phase,
said polymer dispersion being further characterized as containing (on total weight basis) at least 40% by weight dry solids of said external phase and said internal phase, less than 0.7% by weight unpolymerized monovinyl aromatic monomer, at least one part to less than two parts external phase dry solids for each three parts by weight of dry internal phase solids, and a sufficient amount of water to permit the aqueous coating of the printed cellulosic substrate therewith.

23. The method according to claim 22 wherein the styrene polymer dispersion is comprised of a continuous external phase consisting essentially of a maleated drying oil having more than about 25 by weight to about 40% by weight maleic anhydride substituents which are neutralized with a trialkylamine to a pH between 7.5 to 8.5.

24. The method according to claim 23 wherein at least a major portion of polymer particle weight is comprised of polymerized styrene and the average particle size is within the range of about 0.05 to less than 0.25 micron.

25. The method according to claim 22 wherein the polymer particles consist essentially of at least one copolymerized monomer selected from the group consisting of styrene and the vinyl toluene and the dry solids content of the aqueous styrene polymer dispersion ranges from about 50 to about 60% by weight.

26. The method according to claim 25 wherein average particle size ranges from about 0.1 to less than 0.2 micron and the dry solids weight ratio of water-soluble adduct to styrene polymer particles ranges from about 1:3 to 2:3.

27. The method according to claim 26 wherein the styrene-free monomer content on total weight basis of the polymer dispersion ranges from about 0.05 to less than 0.4% by weight and the water-soluble adduct consists essentially of the triethylamine neutralized product thereof.

28. The method according to claim 27 wherein the polymer is comprised of at least 90% by weight of at least one polymerized monovinyl aromatic monomer selected from the group consisting of styrene and vinyl toluene.

29. The method according to claim 23 wherein the aqueous polymer dispersion is diluted with a sufficient amount of water to provide a No. 2 Zahn cup reading ranging from about 25 seconds to about 50 seconds and the average particle size is within the range of 0.1 micron to 0.2 micron.

30. The method according to claim 29 wherein the polymer particles consist essentially of styrene homopolymer particles.

31. In a method for printing pervious cellulosic substrates, such as paper and paperboards, wherein a water-type aqueous ink vehicle containing color imparting and other ink additives is employed to impregnate the substrate surface by rotogravure and flexographic printing means to provide printed substrates thereof, the improvement which comprises the printing thereof with a press-ready ink formulation containing an aqueous polymer dispersion as a major ink binder (on a dry ink binder solids basis), said polymer dispersion comprising:
a. a continuous, aqueous external phase consisting essentially of an adduct reaction product of at least one dicarboxylic acid selected from the group consisting of an alpha, beta-ethylenically unsaturated dicarboxylic acid and an alpha, beta-ethylenically unsaturated dicarboxylic acid anhydride and an unsaturated glyceride oil, said adduct reaction product being neutralized with an aqueous solution of a tertiary amine in an amount sufficient to provide a water-soluble, tertiary amine salt reaction product having a pH within the range of 7.0 to 10.0, and
b. a non-continuous, internal phase of minute polymer particles having an average particle size of less than 0.4 micron uniformly dispersed within said external phase,
said polymer dispersion being characterized as contining at least one part to less than two parts external phase dry weight solids for each three parts by weight dry internal phase solids, the total dry solids weight of said external phase and said internal phase being at least 40% with the remaining nonsolids portion of said polymer dispersion consisting essentially of water, said polymer dispersion being further characterized as containing less than 0.5% by weight monomeric styrene;
said press-ready ink being characterized as having a No. 2 Zahn cup value between about 25 to about 50 seconds and a total dry ink solids weight ranging from about 40 to about 80% by weight, said press-ink being further characterized as having a total dry solids weight between about 40 to about 55% by weight and pigment to binder ratio between about 1:2 to about 1:1 when the major coloring agent (total coloring agent weight basis) is an organic coloring agent; and between 55 to about 80% by weight total dry solids and a pigment to binder ratio from about 3:2 to about 5:2 when the major coloring agent (total coloring agent weight basis) is an inorganic coloring agent.

32. The method according to claim 31 wherein the polymer dispersion is an adduct neutralized with a tertiary amine to a pH between about 7.5 to about 8.5.

33. The method according to claim 31 wherein the unsaturated glyceride oil of the polymer dispersion is characterized as having from at least 2 moles to about 4.5 moles adduct substituents per mole of glyceride oil.

34. The method according to claim 31 wherein the average polymer particle size is within the range of 0.05 micron to less than 0.25 micron and the polymer particles consist essentially of from about 50% by weight to 100% polymerized styrene, about 0 to about 50% by weight polymerized vinyl toluene and 0 to 10% by weight of another polymerized monoethylenically unsaturated monomer other than styrene and vinyl toluene.

35. The method according to claim 32 wherein the glyceride oil consists essentially of a maleic anhydride oil adduct in a molar ratio of at least 2.5 moles to about 3.5 moles of maleic anhydride for each mole of glyceride oil.

36. The method according to claim 35 wherein the glyceride oil is at least one drying oil selected from the group consisting of linseed oil and soybean oil.

37. The method according to claim 36 wherein the styrene polymer particles consist essentially of at least one polymerized monomer selected from the group consisting of styrene and vinyl toluene with styrene (on a weight basis) being the major polymerized monomer.

38. The method according to claim 37 wherein the major ink coloring agent (weight basis) is an organic coloring agent, the dry solids content is within the range of about 40% by weight to about 45% by weight, the pigment to binder weight ratio is from about 3:5 to about 4:5.

39. The method according to claim 38 wherein the polymer particle consist essentially of polystyrene particles having an average particle size of between 0.1 to 0.2 micron.

40. The method according to claim 39 wherein the No. 2 Zahn cup reading ranges from about 25 to about 35 seconds.

41. The method according to claim 37 wherein the major ink coloring agent is an inorganic coloring agent, the dry solids content is within the range of about 65 to about 75% by weight.

42. The method according to claim 41 wherein the average particles size of the styrene polymer particle is within the range of 0.1 to 0.2 micron.

43. The method according to claim 42 wherein the styrene particles consist essentially of polystyrene.

44. The method according to claim 42 wherein the No. 2 Zahn cup value for the press-ready ink ranges from about 25 to about 35 seconds.

45. A printing ink composition suitable for use under ambient printing conditions and containing, uniformly dispersed throughout the ink composition, a polymer dispersion as a principal ink vehicle on a weight basis, said printing ink composition comprising an admixture of:
  A. A polymer dispersion comprising:
  a. a continuous, aqueous external phase consisting essentially of an adduct reaction product of at least one dicarboxylic acid selected from the group consisting of an alpha, beta-ethylenically unsaturated dicarboxylic acid and an alpha, beta-ethylenically unsaturated dicarboxylic acid anhydride and an unsaturated glyceride oil, said adduct reaction product being neutralized with an aqueous solution of a tertiary amine in an amount sufficient to provide a water-soluble, tertiary amine salt reaction product having a pH within the range of 7.0 to 10.0,
  b. a non-continuous, internal phase of minute, monovinyl aromatic polymer particles having an average particle size of less than 0.4 micron uniformly dispersed within said external phase, said polymer dispersion being further characterized as containing (on total dry weight basis) at least 40% by weight of said external phase and said internal phase, less than 0.5% by weight monovinyl aromatic monomer, and at least one part to less than two parts external phase dry solids for each three parts by weight of dry internal phase solids, and
  B. a color imparting agent of at least one member selected from the group consisting of an organic color agent and an inorganic coloring agent with the proviso that when the major coloring agent (on a total dry solid coloring agent weight basis) is an organic coloring agent, the ink composition contains from at least one part by weight to less than two parts by weight organic coloring agent for each two parts by weight polymer dispersion dry solids, and that when the major coloring agent (total dry solids coloring agent weight basis) is an inorganic coloring agent, the ink composition contains from about 3 to 8 parts by weight inorganic coloring agent for each two parts by weight of dry polymer dispersion solids,
  said ink composition being further characterized as containing at least 40% by weight dry solids and a sufficient amount of (A), (B), ink additives and water to provide a No. 2 Zahn cup reading of between 25–50 seconds, with the further proviso that when the ink composition contains organic coloring agents as a major coloring agent (on a weight basis), the total dry solids content of said printing ink composition ranges from about 40 to about 55% and when the inorganic coloring agents are a major color agent, the total dry solids content of said ink composition ranges from at least 55 to about 80% by weight.

46. The printing ink composition according to claim 45 wherein the ink is characterized as having a No. 2 Zahn cup value between about 25 seconds to about 40 seconds.

47. The printing ink composition according to claim 46 wherein the average particle size is within the range of 0.05 micron to less than 0.25 micron, the polymer particles consist essentially of from about 50 by weight to 100% polymerized styrene, about 0 to about 50% polymerized vinyl toluene and 0 to 10% by weight of another polymerized monoethylenically unsaturated monomer other than styrene and vinyl toluene.

48. The printing ink composition according to claim 46 wherein the glyceride oil is a drying oil and consists essentially of a maleic anhydride oil adduct in a molar ratio of at least 2.5 moles to about 3.5 moles of maleic anhydride for each mole of glyceride oil.

49. The printing ink composition according to claim 47 wherein the major ink coloring agent (weight basis) is an organic coloring agent, the dry solids content is within the range of about 40% by weight to about 45% by weight, the pigment to binder weight ratio is from about 3:5 to about 4:5 and the adduct is neutralized with a tertiary amine to a pH between about 7.5 to about 8.5.

50. The printing ink composition according to claim 49 wherein the polymer particle consists essentially of polystyrene particles having an average particle size of between 0.1 to 0.2 micron.

51. The printing ink composition according to claim 50 wherein the No. 2 Zahn cup value for the press ready ink composition ranges from about 25 to about 35 seconds, the glyceride oil is at least one drying oil selected from the group consisting of linseed oil and soybean oil, and the tertiary amine is a tertiary loweralkyl amine.

52. The printing ink composition according to claim 46 wherein the major ink coloring agent is an inorganic coloring agent, the dry solids content is within the range of about 65 to about 75% by weight, and the addition is neutralized with a tertiary amine to a pH between about 7.5 to about 8.5.

53. The printing ink composition according to claim 52 wherein the polymer particle consists essentially of polystyrene particles having an average particle size of between 0.1 to 0.2 micron.

54. The printing ink composition according to claim 53 wherein the No. 2 Zahn cup value for the press ready ink composition ranges from about 25 to about 35 seconds, the glyceride oil is at least one drying oil selected from the group consisting of linseed oil and soybean oil, and the tertiary amine is a tertiary lower-alkyl amine.

* * * * *

UNITED STATES PATENT AND TRADEMARK OFFICE
CERTIFICATE OF CORRECTION

PATENT NO. : 3,951,892  Page 1 of 2
DATED : April 20, 1976
INVENTOR(S) : Raymond L. Drury, Jr., Charles S. Nevin, James W. Hines It is certified that error appears in the above-identified patent and that said Letters Patent are hereby corrected as shown below:

Column 2, line 38, for "color" read ---coloring---
Column 2, line 59, for "40" read ---40%---
Column 2, line 62, for "55" read ---55%---
Column 3, line 61, for "20" read ---20%---
Column 7, line 27, for "0.01" read ---0.01%---
Column 7, line 54, for "3" read ---3%---
Column 7, line 57, for "0.1" read ---0.1%---
Column 8, line 37, for "50" read ---50%---
Column 9, line 30, for ".3-3.0%" read ---.3%-3.0%---
Column 10, line 23, for "0.1" read ---0.1%---
Column 10, line 35, for "45" read ---45%---
Column 10, line 36, for "50" read ---50%---
Column 10, line 41, for "55" read ---55%---
Column 10, line 45, for "45-55%" read ---45%-55%---
Column 12, line 44, for "50" read ---50%---
Column 12, line 46, for "60" read ---60%---
Column 14, line 53, for "40" read ---40%---
Column 14, line 65, for "55" read ---55%---
Column 14, line 68, for "65" read ---65%---
Column 15, line 16, for "60" read ---60%---
Column 16, line 66, for "C: Aqueous Preparation" read ---C: Aqueous Vehicle Preparation---
Column 17, Footnote 4, line 4, for "Red Devil paint conditioner ink is measured"-read ---Red Devil paint conditioners (Red Devil, Inc., Union, New Jersey). Initial viscosity of the standard ink is measured---
Column 18, line 52, for Table Heading, for "B. Organic Base Color" read ---B. Organic Base Color
               Parts by Weight---
Column 18, line 58, for "% Pigmentation 50%" read ---% Pigmentation 30%---
Column 21, line 7, for "2-5%" read ---2%-5%---
Column 21, line 61, for "a 2 Zahn cup" read ---a #2 Zahn cup---

UNITED STATES PATENT AND TRADEMARK OFFICE
CERTIFICATE OF CORRECTION

PATENT NO. : 3,951,892
DATED : April 20, 1976
INVENTOR(S) : Raymond L. Drury, Jr., Charles S. Nevin, James W. Hines It is certified that error appears in the above-identified patent and that said Letters Patent are hereby corrected as shown below:

Page 2 of 2

Column 23, lines 51 and 52, for "The styrene polymer dispersion according to claim 1 wherein the average styrene particle size" read ---The polymer dispersion according to claim 1 wherein the average particle size---
Column 24, line 33, for "50" read ---50%---
Column 25, line 31, for "25" read ---25%---
Column 25, line 46, for "50" read ---50%---
Column 26, line 45, for "40" read ---40%---
Column 26, line 47, for "40" read ---40%---
Column 26, line 50, for "55" read ---55%---
Column 27, line 31, for "65" read ---65%---
Column 28, line 27, for "40" read ---40%---
Column 28, line 31, for "55" read ---55%---
Column 28, line 37, for "average particle" read ---average polymer particle---
Column 28, line 39, for "50" read ---50%---
Column 29, line 4, for "65" read ---65%---

Signed and Sealed this

Fifth Day of April 1977

[SEAL]

Attest:

RUTH C. MASON
Attesting Officer

C. MARSHALL DANN
Commissioner of Patents and Trademarks